R. M. WHITE & E. T. ADAMS.
DUMP WAGON.
APPLICATION FILED JULY 8, 1909.
1,001,328.
Patented Aug. 22, 1911.
2 SHEETS—SHEET 1.
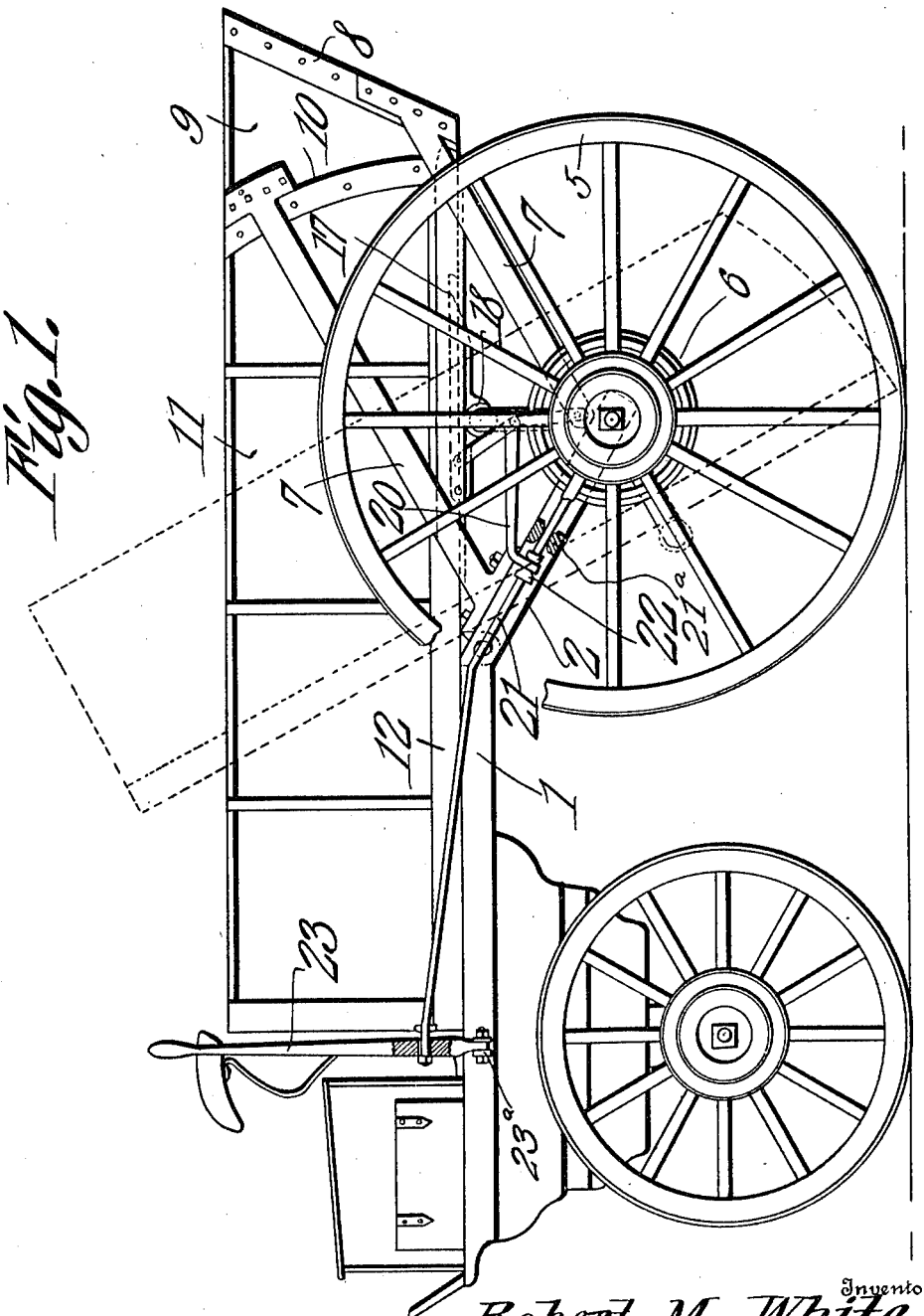

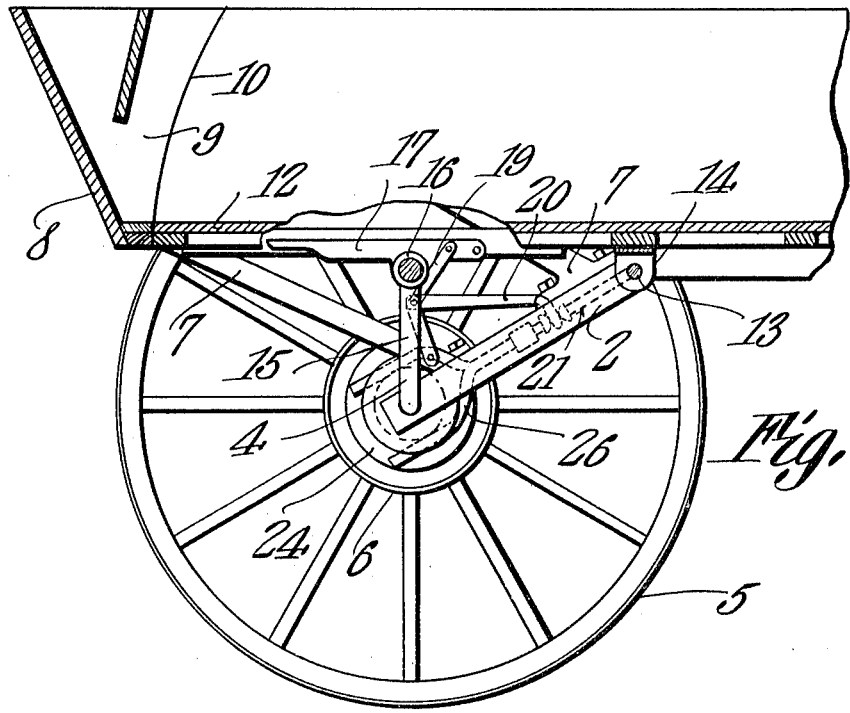
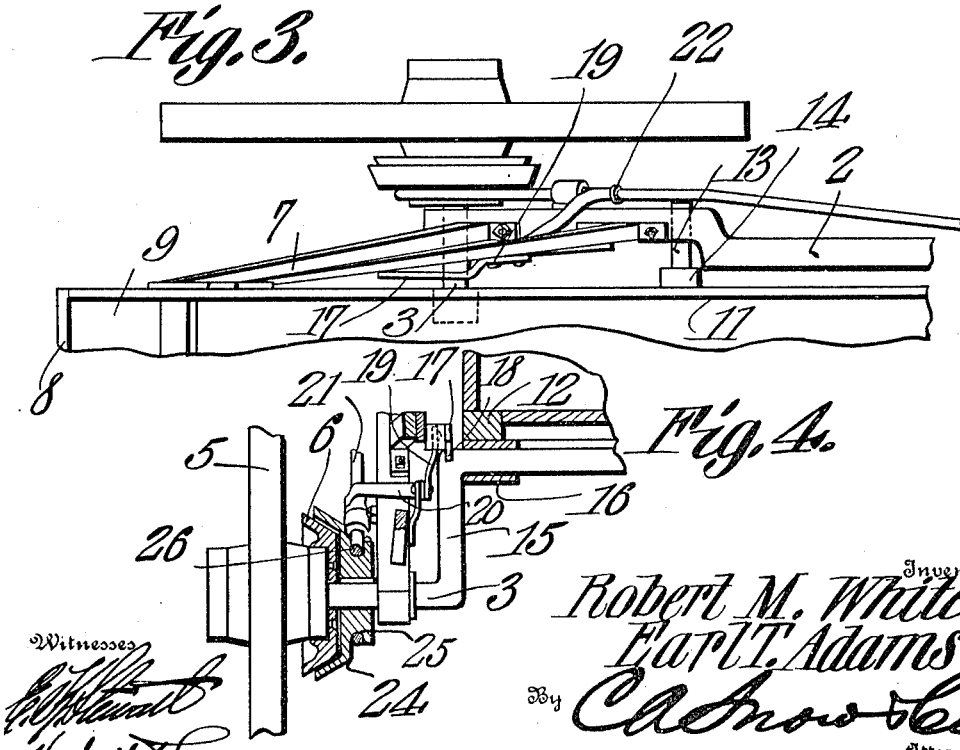

UNITED STATES PATENT OFFICE.

ROBERT M. WHITE AND EARL T. ADAMS, OF PORTSMOUTH, OHIO.

DUMP-WAGON.

1,001,328. Specification of Letters Patent. Patented Aug. 22, 1911.

Application filed July 8, 1909. Serial No. 506,522.

*To all whom it may concern:*

Be it known that we, ROBERT M. WHITE and EARL T. ADAMS, citizens of the United States, residing at Portsmouth, in the county of Scioto, State of Ohio, have invented a new and useful Dump-Wagon, of which the following is a specification.

This invention relates to dumping wagons of that type designed to discharge the load from the rear of the body.

The principal object of the invention is to provide a wagon of this character the rear axle of which is so shaped and located as to constitute the support whereby the body is maintained normally in elevated position.

Another object is to provide a supporting axle designed to be shifted from a predetermined position so as to permit the wagon body to dump its contents, mechanism being utilized whereby the axle can be automatically returned to its initial position, this return movement resulting in the return of the wagon body to raised position.

A further object is to provide novel means for locking the wagon body in elevated position, said locking means, as well as the axle-operating means being under the control of a single lever.

Another object is to provide a wagon of this type which can be dumped while the team is going forward, standing still, or backing, thus making it easy to dump the contents of the wagon over an embankment.

A further object is to provide a dumping wagon which is devoid of complicated parts and will not readily get out of order.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a side elevation of a wagon embodying the present improvements, the position of the wagon body when dumped being indicated by dotted lines. Fig. 2 is a central longitudinal section through the rear portion of the wagon. Fig. 3 is a plan view of the parts shown in Fig. 2. Fig. 4 is an elevation of the hub of the wheel shown in Fig. 3 and showing adjacent parts partly in section and partly in elevation.

Referring to the figures by characters of reference 1 designates the main frame of the wagon, the same being mounted in the ordinary manner at its front end while the rear end of the frame is provided with downwardly and rearwardly inclined side portions 2 in which are journaled the end portions 3 of the rear axle 4. The rear supporting wheels 5 are mounted for rotation upon the end portions of the axle, and secured to the inner end of the hub of each of these wheels is one of the elements 6 of a friction clutch. Supporting strips 7 extend upwardly and rearwardly from the end portions of the arms 2 and are attached to the sides of a tailboard 8 which is thus held fixed at all times with relation to the frame 1, the sides 9 of said tailboard being each provided with a curved edge 10 designed to be engaged by the correspondingly curved end of one of the sides 11 of the tiltable wagon body 12. A rod 13 connects the sides of the frame 1 at the upper ends of the arms 2 and brackets 14 are pivotally mounted on this rod and are secured to and extend downwardly from the bottom of the wagon body 12. The axle 4 is arched, as indicated at 15, this arch being provided with anti-friction rollers 16, designed, when the arch is extended upwardly, to contact with the bottom of the wagon-body 12 and support said body in a substantially horizontal position. A locking catch 17 is pivotally connected to each side of the main frame 1 and has a notch 18 designed to receive the arched portion 15 of the axle so as to hold it in upstanding position. Each catch 17 is connected to the adjoining strip 7 by means of a toggle 19 having a flexible link 20 connected to the middle portion thereof. This link loosely engages a rod 21 which is adapted to slide and to swing within a guide 21ᵃ which is secured to the adjoining arm 2, and collars 22 are arranged upon the rod so as to cause the link 20 to be shifted with the rod 21. An actuating lever 23 is mounted to swing laterally in a bracket 23ª, and said bracket is pivotally connected to the side of the frame 1 adjacent the front end thereof, whereby the lever can be swung both backward and forward and laterally, the said rod 21 being loosely attached to the lever at a point removed from the fulcrum thereof.

Each end portion 3 of the rear axle 4 has a cup-like clutch member 24 keyed or otherwise secured to it and designed to receive the adjoining clutch member 6 heretofore referred to. It is to be understood of course that this member 24 is capable of sliding upon the axle-end 3. An annular groove 25 is formed within the member 24 and is loosely engaged by a fork 26 formed at the rear end of the rod 21.

It is of course to be understood that when the arched portion 15 of the axle is engaged by the catches 17 said arched portion will act as a support for the rear end of the wagon body and said body will thus be held firmly against the side 9 of the tail-board 8. When it is desired to dump the contents of the body the lever 23 is swung forward so as to pull the rod 21 longitudinally. Motion will, therefore be transmitted through the link 20 to each of the toggles 19 and said toggles will be extended and will lift the catches 17 out of engagement with the axle arch 15. The axle will therefore swing downwardly so as to permit the rear portion of the wagon body to drop to the ground, as indicated by dotted lines in Fig. 1, the lower portion of said body assuming a position within the arched portion of the axle. This operation can obviously be performed while the wagon is traveling in either direction, or while it is stationary.

After the wagon has been dumped the same can be moved forward and, at the same time, the driver shifts the lever 23 laterally so as to rock the rod 21 laterally and cause the forked end of the rod 21 to swing outwardly and shift the clutch member 24 into frictional engagement with the clutch member 6. Said member 24 will therefore be rotated with the wheel 5, and the axle 4 will be caused to also rotate. As a result the arch 15 will swing upwardly and thus return the wagon body 12 to its raised position. As the arch portion 15 passes under the notches 18 in the catches 17, said catches will automatically engage said arched portion and thus lock it in raised position.

It is to be understood that the wagon may be provided with two levers 23 and two sets of mechanism such as herein described, or, if preferred, only one lever and one set of locking and clutch mechanism may be utilized.

While the improvements herein described have been set forth as especially designed for use in connection with dumping wagons, it is to be understood that dumping cars may be similarly constructed.

Various changes can of course be made in the construction and arrangement of the parts without departing from the spirit or sacrificing any of the advantages of the invention.

What is claimed is:—

1. A vehicle including a tiltably supported body, a revoluble arched axle for holding the body against tilting movement, means for locking the axle against movement with relation to the body, means for releasing the axle to tilt the body, and means operated by the movement of the vehicle in one direction, for actuating the axle to return the body to raised position.

2. A vehicle including a tiltable body, a revoluble arched axle separate therefrom and constituting means for holding the body against tilting, means for holding the axle against movement with relation to the body, said body, when the axle is released, being tiltable into the arched portion of said axle, and means operated by a wheel of the vehicle when moving in one direction, for actuating the axle to return the body to raised position.

3. A vehicle including a tiltable body, a revoluble arched axle constituting means for holding the body against tilting movement, supporting wheels revolubly mounted upon the axle, means for operatively connecting the wheels and axle to rotate said axle and elevate the tilted body, and means for holding the axle against movement relative to the body when elevated.

4. A vehicle including a tiltable body, an arched axle revolubly mounted thereunder and constituting a support for the body, supporting wheels revolubly mounted upon the axle, means for coupling one of the wheels to the axle to rotate said axle during the movement of the vehicle, the arched portion of the axle being shiftable against the tilted body to elevate it, and means for locking the axle against movement with relation to the body.

5. A vehicle including a tiltable body, a revoluble arched axle thereunder, wheels, means engaging the axle to hold the arch in upright position to support the body against tilting, an actuating lever, and separate means operated by the lever for separately unlocking the axle, and for coupling the axle and a wheel to rotate the axle.

6. A vehicle including a main frame, a tiltable body, an arched axle mounted for rotation within the frame and below the body, the arch of the axle constituting means for holding the body against tilting, supporting wheels mounted for rotation upon the axle, means upon the frame for engaging the arch of the axle to hold said axle against rotation, a toggle connection between said arch engaging means and the
5 frame, a clutch for coupling one of the wheels and the axle, and a lever for actuating the toggle and clutch.

In testimony that we claim the foregoing as our own, we have hereto affixed our signatures in the presence of two witnesses.

R. M. WHITE.
EARL T. ADAMS.

Witnesses:
BERTHA WALDEN,
ROY C. WRIGHT.

Copies of this patent may be obtained for five cents each, by addressing the "Commissioner of Patents, Washington, D. C."